United States Patent [19]

Lewicki et al.

[11] 4,076,872
[45] Feb. 28, 1978

[54] INFLATABLE CELLULAR ASSEMBLIES OF PLASTIC MATERIAL

[76] Inventors: Stephen Lewicki, 7 Forest View Road, Wallingford, Pa. 19086; Gregory David Lewicki, 47 Springhouse Lane, Media, Pa. 19063; Stephen Jon Lewicki, 7 Forest View Road, Wallingford, Pa. 19086

[21] Appl. No.: 778,249

[22] Filed: Mar. 16, 1977

[51] Int. Cl.² .................. A45B 19/00; A45C 7/00
[52] U.S. Cl. ............................... 428/12; 138/93; 156/145; 156/147; 428/36; 428/72; 428/138; 428/101; 428/178
[58] Field of Search ............... 138/93; 4/172.12; 428/12, 36, 72, 73, 137, 138, 178, 188, 101; 156/145, 147

[56] References Cited

U.S. PATENT DOCUMENTS

| | | | |
|---|---|---|---|
| 3,011,930 | 12/1961 | Dworak | 428/178 |
| 3,020,184 | 2/1962 | Cubberley et al. | 428/138 |
| 3,231,454 | 1/1966 | Williams | 428/137 |
| 3,577,305 | 5/1971 | Hines et al. | 428/178 |
| 3,817,803 | 6/1974 | Horsky | 428/178 |
| 3,818,522 | 6/1974 | Schuster | 428/137 |

Primary Examiner—William R. Dixon, Jr.
Attorney, Agent, or Firm—Samuel Lebowitz

[57] ABSTRACT

Pneumatic structural and cushioning material of plastic sheets, bands, and/or tubes, which are compartmentized into a plurality of chambers. The material is capable of convenient and economical storage and shipment in a collapsed state and rapid inflation to an operative state at the point of use. The chambers embody one-way valving arrangements to maintain the chambers in an expanded state over long periods of time, rendering the product useful in cushioning loads during shipment by land, air or water; in safety devices for humans in vehicle bumpers, air cuhsins, and buoyant devices of all types; and in structural assemblies of either temporary or permanent types to attain heat and sound insulation effects.

11 Claims, 17 Drawing Figures

INFLATABLE CELLULAR ASSEMBLIES OF PLASTIC MATERIAL

This invention relates to the production of inflatable cellular assemblies of plastic material, adapted to be filled with air or other gas to attain cushioning or other effects, which may be used in many industrial fields for different purposes.

It is the object of the present invention to improve the production of quilted laminated plastic sheets and bands which are economical to produce and which may be conveniently stored and shipped preparatory to their ultimate handling at the point of use to render them effective for their intended purposes.

It is another object of the invention to simplify the manufacturing procedures in the production of laminated plastic sheets which are adapted to be inflated for use at their ultimate destination by means of self-sealing valving arrangements which are incorporated in the laminated sheeting, which are effective at varying degrees of inflation in dependence upon the specific needs to be served, and which remain effective for their intended purposes over long periods of time.

It is another object of the invention to produce effective and economical pneumatic cushioning material from plastic sheets and tubing, which is compartmentized into multiple cells or chambers to provide clean and effective substitutes for loose dunnage used in the cushioning of articles against damage by shock or blows when such are shipped by rail, airplane or auto vehicles.

More specifically, it is the object of the present invention to simplify the production of laminated plastic sheeting subdivided into a plurality of sealed air-filled chambers which present improvements over the practices in the prior art as exemplified by U.S. Pat. Nos. 3,011,930, Dec. 5, 1961; 3,660,189, May 2, 1972; 3,868,285, Feb. 25, 1975, and others.

The invention herein is useful not only for the production of cushioning material but also for multi-cellular gas-filled assemblies which may be useful in temporary or permanent building structures and in the attainment of heat and sound insulation effects therein, as well as in vehicles and other structures, as well as for safety devices such as air cushions, vehicle bumpers and the like.

Other objects and purposes will appear from the detailed description of the invention following hereinafter, taken in conjunction with the accompanying drawings, wherein FIG. 1 is a perspective view of the separate components of a basic embodiment of the invention, featuring automatically operating valving arrangements for the discrete gas chambers forming the essential part of the invention;

Figure 1:
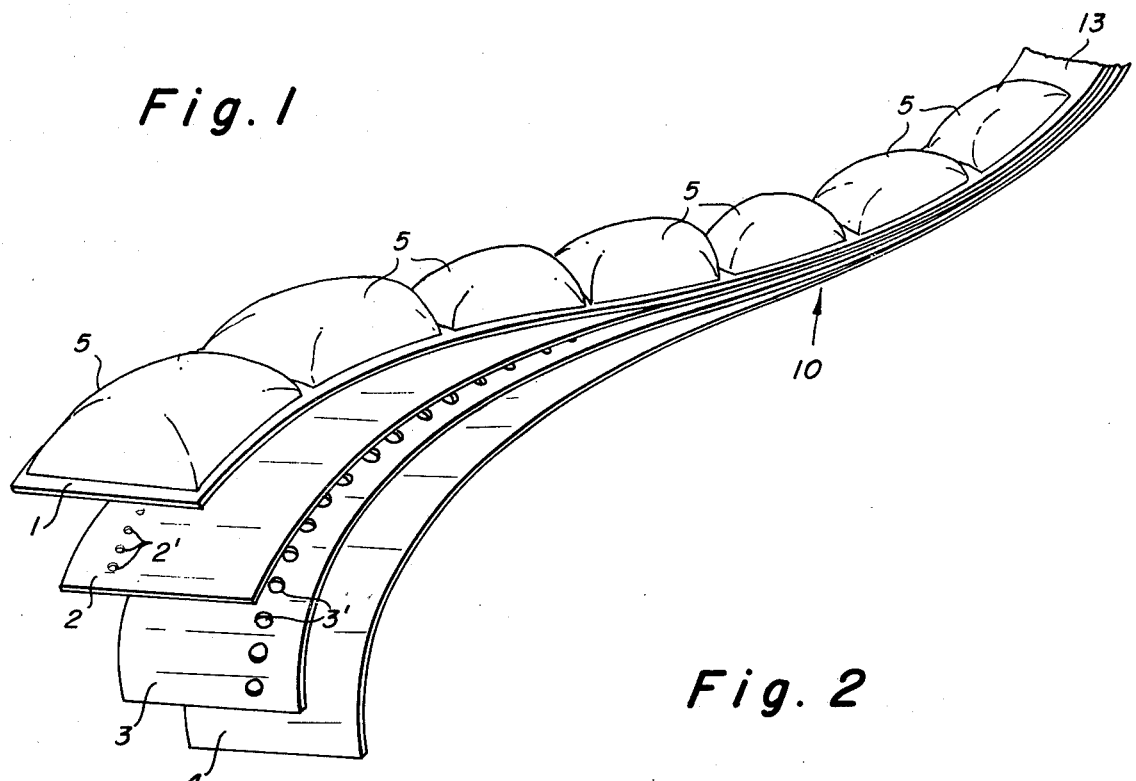
Figure 2:
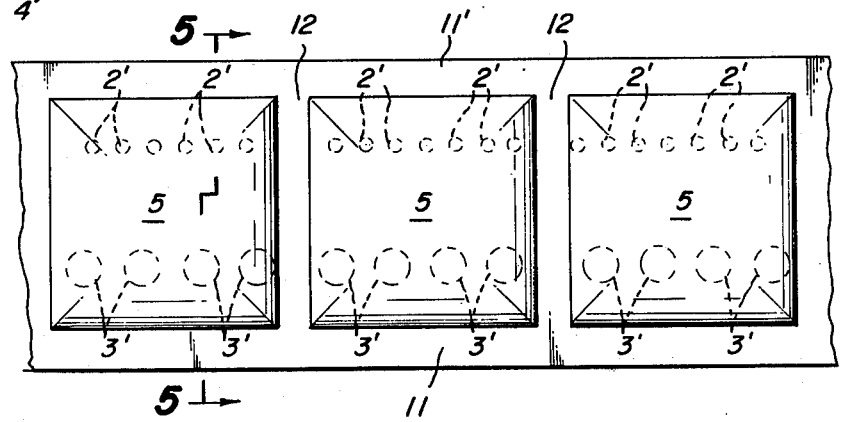
FIG. 2 is a plan view of the assembled embodiment shown in FIG. 1.
Figure 3:
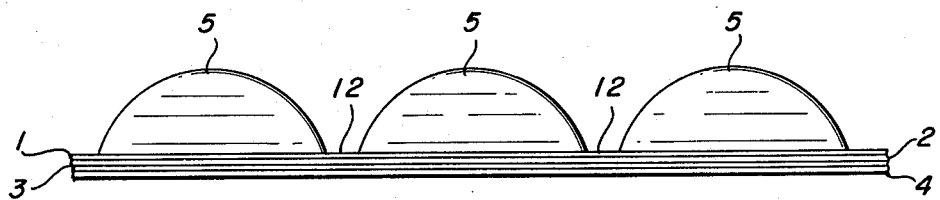
FIG. 3 is a front elevation of FIG. 2.
Figure 5:
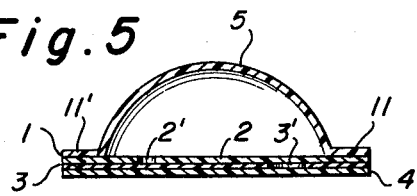
FIGS. 4 and 5 are vertical sectional views along line 5—5 of FIG. 2, the former illustrating the interconnection of the plastic sheets with the valve openings therein in the course of filling the gas chambers, and the latter illustrating the position of the parts at the end of the injection of the gas into the chambers.

The first embodiment of the invention is illustrated in simplified form in FIGS. 1 to 6 of the drawings. The cushioning unit 10 is preferably formed of four laminations. The uppermost sheet 1 is a thermoplastic polymeric film such as polyethelene, polypropylene, polyesters, nylon, polyvinyl chloride, polyvinylidene, polyurethane, etc., having a thickness which may range from 0.3 mil to 5 mil. or more, depending upon the intended use of the material which, of course, is gas impervious as well as abrasion and wear resistant.

Walls 5, to outline the gas chambers, are pre-formed in the sheet 1 by heat and/or vacuum, so that these may be collapsed or distended by gas pressure, and the boundaries of these are sealed by heat, solvents or adhesive to at least one underlying planar sheet of plastic material. Thus, the opposite edges and the transverse or cross-seals 12 serve to effect adhesion of the sheet 1 to the underlying thermoplastic sheets 2 and 3, which are thinner than sheet 1, along the longitudinal edges 11,11′ and the transverse or cross-seals 12 extending between the edges which compartmentize the sheet into a plurality of chambers 5. Sheets 2 and 3 are provided with rows of apertures 2′ and 3′, respectively, along displaced lines of the sheets 2 and 3, and preferably the apertures 2′ of sheet 2 are smaller than the apertures 3′ in sheet 3.

Figure 4:
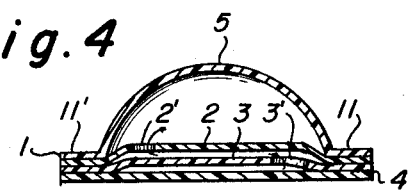
Figure 6:
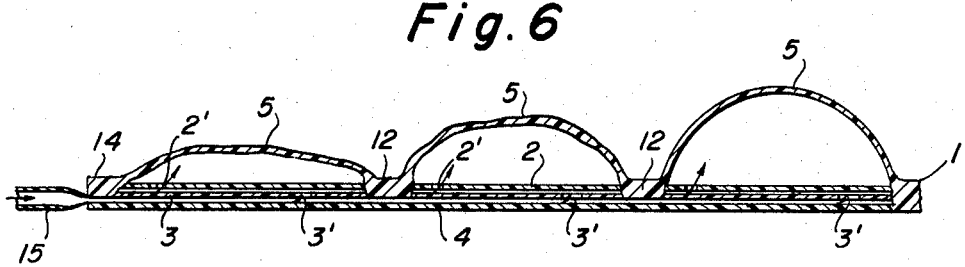
FIG. 6 is a longitudinal sectional view of FIG. 2, illustrating the effect of the incoming gas on the series of chambers in the course of the filling operation illustrated in FIG. 4, and preparatory to the assumption of the parts shown in FIG. 5 when the air injection is stopped at any desired degree of inflation.
Figure 7:
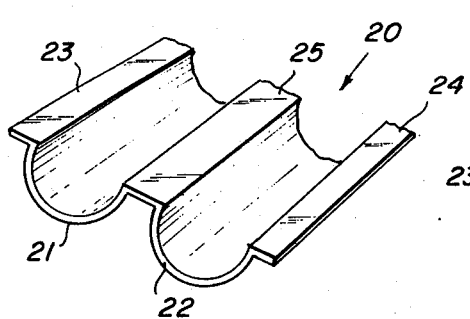
FIG. 7 illustrates a second embodiment of the invention starting with a portion of a length of plastic sheeting which is contoured for the fabrication of a double set of opposed air chambers of the type shown in FIG. 1.
Figure 8:
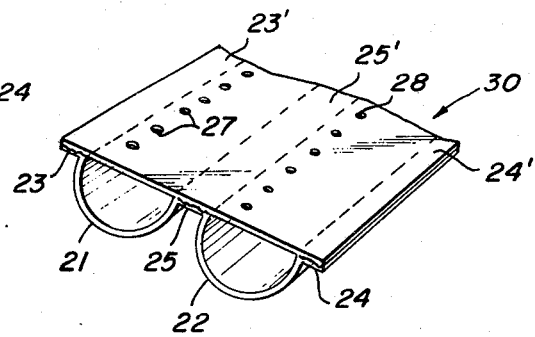
FIGS. 8 to 11 are perspective views illustrating the procedural steps for converting the originally formed plastic sheeting shown in FIG. 7 to the assembly shown in FIG. 11.

The base outer sheet 4, which is thicker than the sheets 2 and 3 and which is both wear-resistant as well as gas-impervious, underlies the assembly of sheets 1, 2 and 3, and is sealed along the longitudinal edges 11,11′ as well as at the end 13. The opposite end 14 is open for the admission of a gas under pressure into the laminated assembly through tube 15 which, as illustrated in FIGS. 4 and 6 permits the gas to pass through the openings 3′ in sheet 3 and thereafter through apertures 2′ in sheet 2 for entry into the several bubbles or chambers 5. The thinned molded plastic protrusions 5 may be collapsed to exhaust the air therefrom through apertures 2′ and 3′ and the flattened sheet may be folded or rolled until it is ready for use. When this is done by connecting an injecting tube 15 to the inlet end, as shown in FIG. 6, the flattened protrusions become partially or fully extended, and when the pressures in these chambers exceed that of the incoming air, and certainly at any time when the gas inlet tube 15 is removed from the assembly, the portion of the sheet 2 with the openings 2' are forced into contact with the solid portion of the sheet 3 therebelow to seal off the egress of the gas from the respective chambers, at any degree of their inflation. Furthermore, the solid area of sheet 2 is pressed against the series of apertures 3' in the underlying sheet 3 to close these openings against egress of air, whereupon the assembly is distended for contact with the articles sought to be protected either simultaneously with the gas injection into the assembly, or thereafter, to prevent their movement and eventual breakage and shock. The simultaneous distension of the gas bubbles and contact cushioning of the articles is practiced in those instances where it is desirable to dispose the cushioning strip in its collapsed state around the articles being protected and to inflate the bubbles 5 to any necessary degree to attain differential cushioning effects, depending upon the variable contours of the articles being protected.

While the base sheet 4 may be of thermoplastic sheet material, as are the other layers, the purposes of the invention may be served if such is formed of semi-rigid material such as cardboard which is impregnated with a plastic or wax to render it gas impervious as well as adherent to the superposed layers 1, 2 and 3 along the longitudinal edges by means of heat, adhesive, etc. Furthermore, the advantages of the invention may be realized to a less effective degree by the use of a single intermediate sheet, in lieu of two sheets 2 and 3, which is pressed by the preponderant pressure in the chambers 5 against the solid base layer 4, below the intermediate sheet with the valve openings therein.

Also, apertures 3' in sheet 3 may be of the same size as the apertures 2' in sheet 2 without affecting deleteriously the valving functions performed thereby.

While FIG. 1 shows a single row of distendable chambers 5, it is understood that the invention may be applied to large areas of plastic sheets to form these extensible chambers along multiple longitudinal rows as well as transverse rows as is commonly known in the art and illustrated in the patents mentioned above.

Another embodiment of the invention is shown in FIGS. 7 to 11 to form a series of gas chambers on opposite faces of a base sheet of plastic. In this construction, a sheet 20 of thermoplastic material is shaped with a pair of troughs or valleys 21,22 by vacuum, or vacuum with heat molding, with an intermediate planar edge 25 between them, and the outer planar edge 23 adjacent through 21 and an outer planar edge 24 adjacent trough 22. The wear-resistant unit 20 is superposed by a thinner sheet of thermoplastic material 30, which is sealed to the former by heat, adhesive or solvent at the opposite edges 23' and 24', and at the intermediate portion 25', to the above-mentioned planar edges 23, 24 and 25, respectively. The sheet 30 is also provided with a plurality of rows of apertures 27 and 28 overlying the troughs 21 and 22, respectively, preferably in corresponding positions, so that when the troughs are flapped over each other, around the longitudinal median 25, 25 as an axis, as clearly shown in FIGS. 10 and 11, the apertures will be disposed in non-aligned rows.

Figure 9:
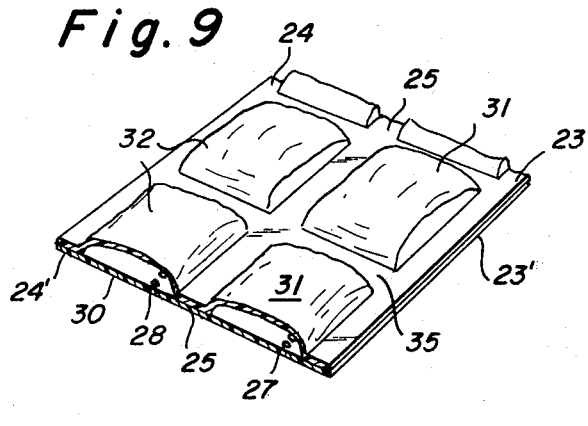
Figure 10:
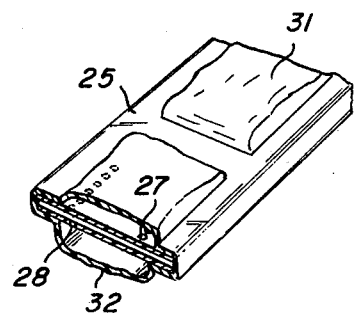
Figure 11:
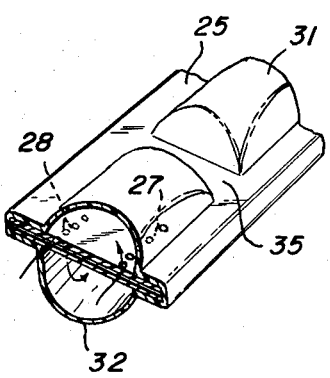

FIG. 9 shows the obverse position of the sheets 20 and 30 and illustrates the transverse or cross-seals 35 which convert the longitudinal troughs 21 and 22 into a plurality of rectangular pyramidal bubbles, to function as gas chambers 31 and 32, respectively. The assembly shown in FIG. 9 is folded longitudinally along the seam 25,25' to dispose the gas chambers 32 below the gas chambers 31, and the outer edges 23 and 24 are sealed in any suitable manner which, in conjunction with the integral seal 25,25' results in an assembly as shown in FIG. 11 wherein the gas chambers 31 superpose the gas chambers 32, at which time the air may be pressed therefrom for egress through apertures 27 and 28 and the space between portions of sheet 30, followed by the folding or rolling of the assembly upon a reel to provide a very compact mode of storage or shipment.

When the material is intended to be used, pressurized air is introduced into the space between juxtaposed folded surfaces of sheet 30, so that a portion thereof will pass through the apertures 27 to inflate the gas chambers 31 while another portion thereof will pass through the apertures 28 to inflate the chambers 32 to any desired degree. When the gas pressure in the chambers rises to a sufficient degree which exceeds the pressure of the incoming gas, the relatively thin plastic sheeting 30 will be pressed into contact with the adjacent portion of the same sheeting to close off the apertures 27 and 28. This would be the case when the source of gas pressure is removed from the space between the two superposed layers of sheet 30.

As described above, the embodiment of the invention illustrated in FIGS. 7 to 11, features a single pair of troughs superposed by a sheet of plastic with valve openings therein. If desired, the shaped or stretched sheet 20 may be formed with any number of rows of troughs which may be covered by the planar thin sheet of thermoplastic material 30, and a similar assembly could be superposed thereupon as long as the outer and intermediate edges are sealed longitudinally similarly to the edges 23,23', 24,24' and 25,25', which is followed by the transverse sealing of the multiple rows to form large areas of air chambers 31 and 32. Alternatively, cushioning material of large areas with multiple rows of distendable gas chambers could be formed by providing multiple pairs of troughs and folding over one symmetrical portion over the other and sealing the longitudinal edges between the rows in a manner similar to that illustrated in FIGS. 7 to 11 with a single pair of troughs. In all of the variant forms described above, the rows of apertures 27 and 28 in the respective overlying rows of air bubbles must be out of alignment to attain a seal against the adjacent sheets.

Figure 12:
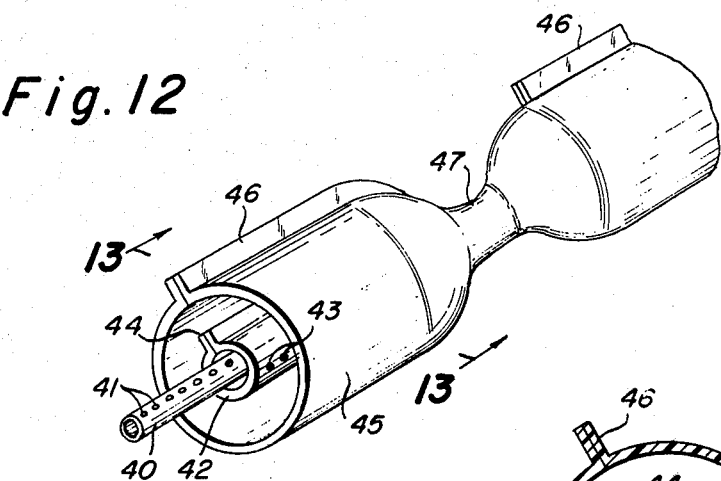
FIG. 12 is a perspective view of still another embodiment of the invention for producing a string of gas cells or chambers with valving arrangements incorporated therein.
Figure 13:
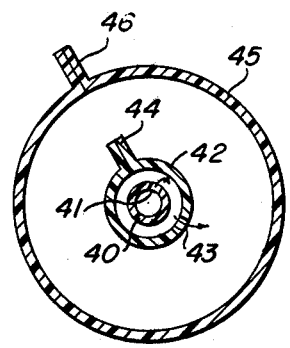
FIG. 13 is a vertical sectional view along line 13—13 of FIG. 12.

A variant embodiment of the invention, with an automatically operating valving arrangement similar to those described above, is illustrated in FIGS. 12 and 13. In this case, a self-sustaining tubular core of thermoplastic material 40 is provided with a plurality of apertures 41 along the length thereof. Surrounding it is a sheet of thin plastic material which may be sealed at the outer edges 44 or which may be of integral tubular formation. A row of apertures 43 is provided in tube 42 which is offset from the apertures 41, and surrounding the above-mentioned tubes 40 and 42 is a sheet 45 of rugged and gas-impervious thermoplastic material, the opposite ends of which may be joined along a longitudinal seam 46, or which may be of integral tubular formation. The outer wear-resistant tube of plastic is compartmentized into a series of bubbles or gas chambers by heat sealing longitudinally displaced portions 47 of the tube 45 to the inner tube 42 and the central tube 40. This may be done by a pair of heated jaws which are provided with aligned semi-cylindrical recesses of a diameter to accommodate tube 40 and the layers of plastic sheeting surrounding it to effect their coalescence at displaced points 47. The air in the chambers may be exhausted before this sealing operation, or the air may be exhausted from the individual chambers by merely squeezing on the outer chambers so that the air passes therefrom through the openings 43 and openings 41 through the interior of the core to one or both ends until one of these is sealed to make possible the injection of compressed air into the other one. The assembly can be maintained in reeled form until required for use, when it is packed around articles to be protected against shock, followed by the injection of a gas into the open end of tube 40 and the string of bubbles surrounding it. The individual gas chambers become filled with the gas entering through apertures 41 and openings 43 until such time as the gas pressure on the interior of the chambers will press the thin sheet of plastic 42 against the lateral surface of the central core 40 to arrest the egress of the gas from the individual chambers.

Figure 14:
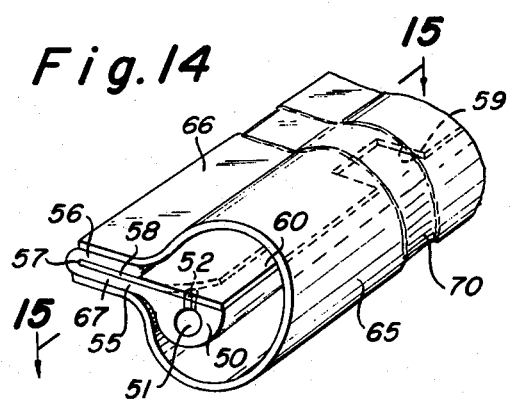
FIG. 14 is a perspective view of another embodiment of the invention for attaining a string of gas chambers along a specially molded central core.
Figure 15:
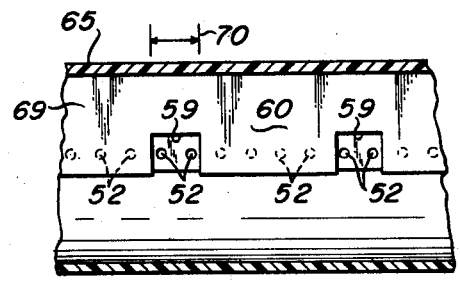
FIG. 15 is a horizontal sectional view along line 15—15 of FIG. 14.

FIGS. 14 and 15 disclose another embodiment of the invention which features an enlarged core 50 formed of extruded thermoplastic material having a special cross-section characterized by a longitudinal bore 51 through its thickest portion and a bifurcated or slotted flange extending from the core 50. The flange is constituted by superposed arms 55 and 56 to form a slot 57 therebetween. The core 50 of the extrusion is flattened in the plane of the slot 57 and a plurality of passages 52 extend from the central bore to the exterior thereof. One edge of a flexible strip 69 of plastic is inserted into the slot 57 and the opposite edge thereof overlies the flattened outer surface of the core member 50 and the openings 52 in the latter. The latter edge is of castellated outline formed by rectangular notches 59 between rectangular portions 60 (FIG. 15). The portions 60 serve as flap valves for alternatively covering and uncovering the passages 52 leading from the interior of the tubular core member. These flap valve portions 60 are sectionalized by surrounding the core 50 and strip 69 with a sheet 65 of wear-resistant thermoplastic material and shaping it into tubular form by sealing its opposite edges 66 and 67 to the outer faces of the arms 55 and 56 of the slotted flange and heat-sealing the entire assembly at longitudinally displaced points 70 to subdivide the latter into a plurality of inflatable air chambers. The cross-seals 70 include the flexible sheet of plastic 69 at the narrowed portions 59 which, in effect, form the separable individual flap valves in each of the chambers for the passages 52. Thus, air injected under pressure at one end of the bore opening 51 is admitted into the individual chambers 65 by the lifting of the flap valve 60 in each chamber from the openings 52 below it. When the pressure in the gas chambers exceeds the pressure of the incoming gas, the flap valves close, to seal off the egress of the gas therefrom to permit the assembly to remain in its inflated state.

If desired, the outer wear-resistant tube may be of integral construction with a circumferential portion thereof sealed to the outer faces of arms 55 and 56 with the remainder fitting the core loosely, except at the seal points 70 where the tube 65 is integrated in its entirety to the exterior of the core, slotted flange and the plastic strip retained thereby.

Figure 16:
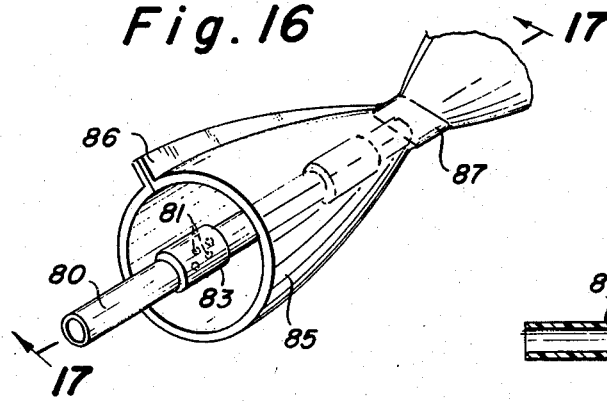
FIG. 16 is a perspective view of still another embodiment of a string of sealed gas chambers surrounding a tubular core.
Figure 17:
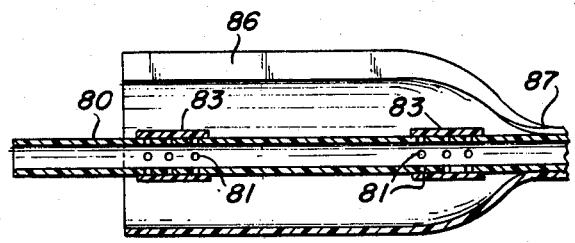
FIG. 17 is a sectional view along line 17—17 of FIG. 16.

Another embodiment of the invention for forming a string of gas chambers along a central core is illustrated in FIGS. 16 and 17. In this construction, a self-sustaining tube 80 of thermoplastic material is provided with one or more openings 81 at longitudinally displaced openings along the length of the tubular core. These openings are covered with a fast drying liquid coating 83 which is flexible and operates as a closure valve for the openings 81. This elastic material may be a silicone rubber such as RTV rubber which conforms to the shape of the tube and which will be cured upon its application thereto so that it may exert a valving action on the openings. Similar effects may be attained with movable tubular covers for the valve opening formed of "Saran" sheeting, polyvinyl chloride, copolymer films, etc.

A sheet 85 of rugged thermoplastic material surrounds the central core with the special valving assemblies 83 along the length thereof, and the sheet may be sealed along the longitudinal edges 86 to form the tubular encasement around the central core 80. Alternatively an integral tube of thermoplastic material may be used to enclose the central core, and in either case, cross-seals 87 are applied to the to the tubular casings to sectionalize the outer tube into a plurality of chambers. The injection of compressed air or any other suitable gas under pressure into one end of the central core 80 against the opposite end which is sealed, will serve to force air into the several chambers 85 by the lifting of the flexible plastic closures 83 from the openings 81 to admit the gas into the chambers until such time as the pressure in the latter predominates over the pressure of the incoming gas. The gas chambers remain in an inflated state as long as this condition prevails, and, of course, whenever the injection of gas into the assembly is arrested.

Depending upon the ruggedness of the outer tubular sheets or tubes, the gas chambers may be used in many different industrial locales and for purposes other than the cushioning of packaging material. Such applications include heat and sound insulation, and safety systems for both articles and humans, such as vehicle bumpers, buoyant safety devices an apparel for water sports, etc.

We claim:

1. An inflatable laminated pad of plastic sheet material, comprising
    (a) an elongated outer wear-resistant sheet of plastic material provided with a plurality of discrete collapsed but extensible bubbles along the length thereof,
    (b) a second elongated outer wear-resistant sheet of plastic material sealed to said first sheet along the longitudinal edges common to both sheets, whereby the injection of a compressed gas into the space between said sheets effects the distension of said bubbles, and
    (c) at least one intermediate layer of thin apertured plastic sheeting between said outer layers to permit the expansion of said bubbles to a degree sufficient to build up a pressure of such intensity on the solid areas of said intermediate layer as will force said apertured layer into contact with said second sheet to seal off the communication between said outer sheets when the gas pressure is removed from the inner face of said second outer sheet.
2. An article as set forth in claim 1, including two intermediate layers of thin plastic sheeting each provided with a row of apertures extending in parallel to said longitudinal edges but out of alignment with each other.

3. An article as set forth in claim 2, wherein said rows of apertures are adjacent to but displaced from said longitudinal edges.

4. An inflatable continuous laminated pad of plastic sheet material, comprising
   (a) an elongated sheet of wear-resistant plastic material shaped into two longitudinally extending juxtaposed troughs with planar outer and intermediate edges,
   (b) a cover of thin sheet plastic material sealed to said first-mentioned sheet at said planar edges and provided with rows of apertures, which upon folding over each other at said intermediate edge become laterally displaced,
   (c) transverse seals between said first-mentioned sheet and cover at longitudinally displaced points to compartmentize the latter into a plurality of separate chambers, whereby the injection of a compressed gas into the space between the juxtaposed layers of the folded cover sheet effects the distention of said chambers by the passage of the gas through said displaced rows of apertures, which are adapted to be closed by the adjacent full surface portion of the cover when the pressure engendered in the chambers is sufficient to force the apertured portion of the cover against said full surface portion.

5. An article as set forth in claim 4, wherein said rows of apertures are in the same corresponding position adjacent to an edge of each trough, prior to the folding over each other.

6. An inflatable continuous laminated pad of plastic sheet material, comprising
   (a) an assembly of an elongated sheet of wear-resistant plastic material shaped into a plurality of longitudinally extending juxtaposed troughs with planar outer and intermediate edges,
   (b) a cover of thin sheet plastic material sealed to said first-mentioned sheet at said planar edges and provided with rows of apertures overlying each of said troughs and displaced from the longitudinal centers thereof, and
   (c) transverse seals between said first-mentioned sheet and cover at longitudinally displaced points to compartmentize the latter into a plurality of separate chambers,
   (d) a second assembly identical to said first-mentioned assembly sealed to each other in allochiral relation at one end and along said outer longitudinal edges only with said covers in juxtaposition, to form a space therebetween for the injection of a compressed gas thereinto to effect the distention of said chambers by the passage of the gas through said displaced rows of apertures, which are adapted to be closed by the adjacent full surface portion of the adjacent cover when the pressure engendered in the chambers is sufficient to force the apertured portion of the respective cover against said full surface portion of the other cover.

7. A continuous length of inflatable chambers of plastic sheet material, comprising
   (a) a self-sustaining tubular core member sealed at one end and having a plurality of apertures along the length thereof,
   (b) a thin tubular sheet of plastic material surrounding said member having a plurality of openings along the length thereof displaced radially from said first-mentioned apertures,
   (c) a tubular casing of air-impermeable plastic sheet material surrounding said member and outer tubular sheet and sealed together at longitudinally displaced points which include a plurality of said apertures and openings, to define said chambers, adapted to be distended by the injection of a compressed gas into the open end of said member for passage into said chambers through said apertures and openings, and which, upon the cessation thereof, are sealed in an inflated state by the stoppage of gas from said chambers, in consequence of the pressure therein effecting the closure of the openings in the thin tubular sheet by pressure against said tubular core member.

8. An article as set forth in claim 7, wherein said apertures in said tubular core and said openings in said tubular sheet are arranged in straight rows which are displaced radially from each other.

9. A continuous length of inflatable chambers of plastic sheet material, comprising
   (a) a hollow core member of plastic material sealed at one end and having a flattened outer surface with a slotted flange extending outwardly from said surface, said core member being provided with a plurality of apertures between said surface and the interior of said core member,
   (b) a strip of plastic sheeting in the slot of said flange overlying said flattened outer surface with one edge thereof within the slot of said flange and the opposite edge thereof of castellated outline,
   (c) an air-impermeable plastic sheet encasing said hollow core member and adapted to have the opposite longitudinal edges thereof sealed to the exterior of said flange to form a confining space therearound,
   (d) a plurality of transverse seals at longitudinally displaced points of said plastic sheet and coincident with the reduced widths of the strip to compartmentize said space into a plurality of separate chambers, with the strip adjacent the free edges thereof functioning as flap valves for said apertures,
   (e) said chambers adapted to be distended by the injection of a compressed gas into the open end of said hollow member for passage into said chambers through said apertures, and which, upon cessation of said injection, are sealed in an inflated state by the stoppage of gas from said chambers in consequence of the pressure therein acting on the flap valves to close the apertures in said hollow core member.

10. A continuous length of inflatable chambers of plastic sheet material, comprising
    (a) a self-sustaining tubular core member sealed at one end and having a plurality of apertures at longitudinally displaced points along the length thereof,
    (b) flexible and distendable coverings of plastic material overlying said apertures,
    (c) a tubular casing of air-impermeable plastic sheet material surrounding said member and sealed thereto at longitudinally displaced points between said apertures to define said chambers, adapted to be expanded by the injection of a compressed gas into the open end of said member for passage into said chambers through said apertures upon the distention of said surrounding covering, and which, upon the cessation of said injection, are sealed in an inflated state by the stoppage of gas into said chambers, in consequence of the pressure therein on said coverings against said tubular core member to close said apertures.

11. A device as set forth in claim 10, wherein said flexible coverings are formed by a fast-drying elastomeric coating solution.

* * * * *